Aug. 30, 1966  G. KIPER  3,269,294
BETWEEN-THE-LENS SHUTTER ASSEMBLY
Filed July 16, 1964  3 Sheets-Sheet 1

INVENTOR.
GERD KIPER
BY

Aug. 30, 1966 G. KIPER 3,269,294
BETWEEN-THE-LENS SHUTTER ASSEMBLY
Filed July 16, 1964 3 Sheets-Sheet 2

INVENTOR.
GERD KIPER
BY

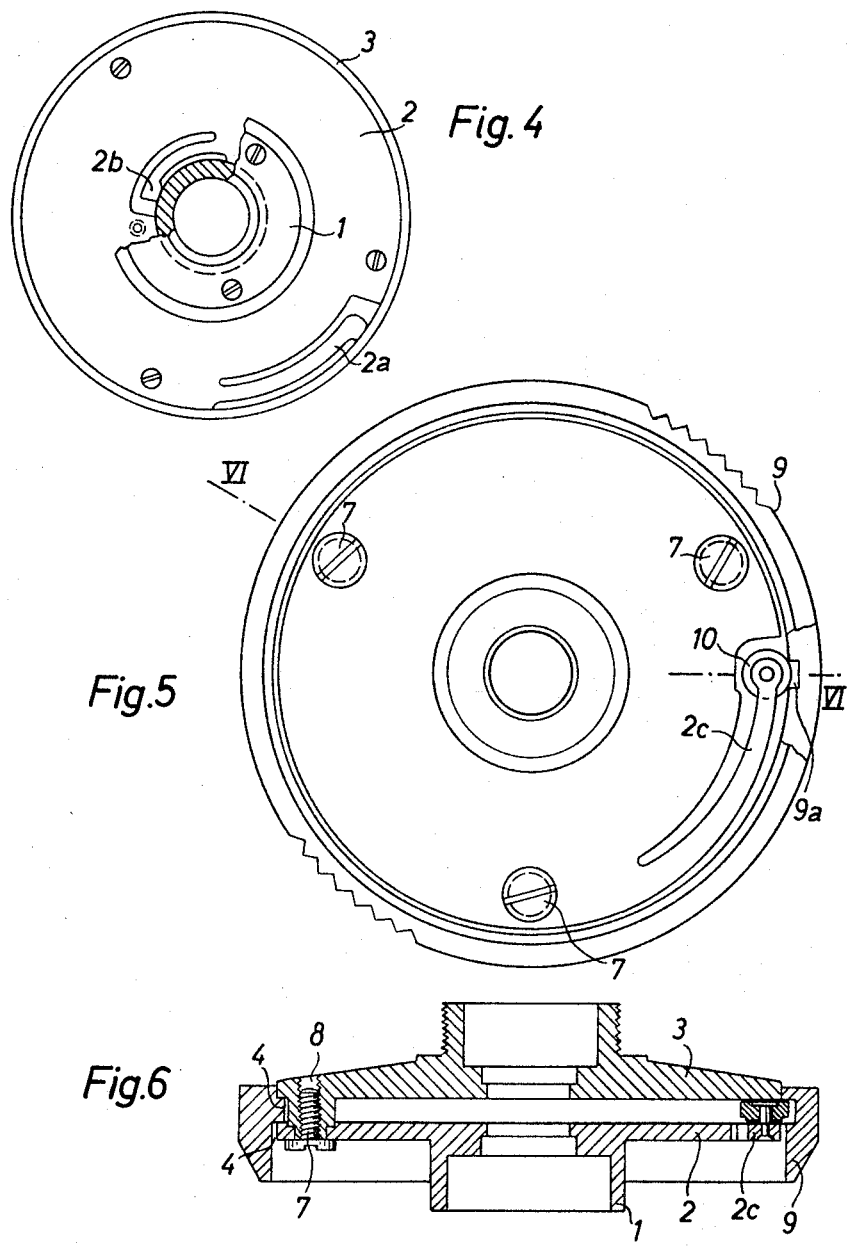

United States Patent Office 3,269,294
Patented August 30, 1966

3,269,294
BETWEEN-THE-LENS SHUTTER ASSEMBLY
Gerd Kiper, Unterhaching, near Munich, Germany, assignor to Agfa Aktiengesellschaft, Leverkusen-Bayerwerk, Germany
Filed July 16, 1964, Ser. No. 383,079
Claims priority, application Germany, Aug. 24, 1963, A 43,892
13 Claims. (Cl. 95—63)

This invention relates to a mounting arrangement for a between-the-lens shutter assembly and more particularly to such a mounting arrangement for controlling concentric alignment of the lens holding rings.

Between-the-lens shutters are frequently preferred over focal-plane shutters because of the relatively small size of the between-the-lens shutter components which makes this shutter arrangement convenient in small folding cameras, as well as its freedom from distortion and dynamic vignetting with moving objects. In between-the-lens shutter assemblies the shutter sectors are arranged between a pair of components of the objective lens. In assembling the objective lens holding rings, such as the shutter housing and the lens tube, the lens holding rings must be concentrically aligned as closely as possible. For example, optical quantity requirements make it essential that the lens holding rings are concentrically aligned within tolerances of about 0.02 to 0.03 mm. In order to attain these tolerances the rings are finally bored after the shutter is assembled.

The shutter housing and shutter plate are usually detachably connected with the lens tube by screws to facilitate disassembling the parts in case of repair. During manufacture the shutter housing and shutter plate are assembled with a slight amount of clearance between them. Where the shutter plate and lens tube are separate parts, there is also a slight amount of clearance between these parts. Because of this clearance, the maximum play between the parts can be as high as 0.05 to 0.1 mm. per pair before the parts are screwed together. If this play is not eliminated or controlled, the lens holding rings may become more misaligned.

When the parts are detached, for example, if the shutter sectors and their control elements or the diaphragm are damaged, the high degree of accuracy which was achieved by the boring operation during final assembly, is lost upon reassembly because of the play or clearance inherent in screw connections. As a result, there is a probability that the parts will not remain in precisely their original relative position. In some instances the concentric misalignment between the lens holding rings can be for example 0.15 mm. which, of course, greatly reduces the lens quality. To again improve the lens quality is then necessary to replace one of the lens holding rings with a new part and to again bore this new part to receive its objective lens component. Obviously, this is undesirable because these parts are particularly expensive and because the boring of the lens holding rings is also expensive and can be done only in specially equipped work shops or if necessary at the factory.

An object of this invention is to provide an effective mounting arrangement for minimizing the concentric misalignment between the lens holding rings in a between-the-lens shutter assembly.

In accordance with this invention the concentric misalignment with respect to the optical axis is minimized by controlling the pattern of clearance between the lens holding rings. This is accomplished by providing a resilient stay between the rings which reacts perpendicular to the optical axis to urge the parts into firm contact with each other to forceably maintain the clearance between them in a predetermined angular orientation about the optical axis both before and after the screws, rivets, or other fasteners are attached. The resilient stay reacts in such a way that the pattern of contact and of clearance is maintained in a predetermined position, rather than left to chance, so that the alignment of the lens holding rings is maintained within acceptable tolerances. Because the lens holding rings are always maintained in this predetermined position, their original degree of concentric alignment is likewise maintained, even when the shutter is disassembled in case of repair and then reassembled.

The resilient bracing or positioning of the rings may be effected in a number of advantageous ways. For example, springs may react between the shutter plate and lens housing and between the shutter plate and lens tube to maintain the clearance between each pair of members in an extreme position. The springs for positioning the rings may also conveniently be utilized for performing other necessary shutter functions.

In a particularly advantageous form of this invention the springs are integral with the parts by, for example, stamping resilient arms out of the shutter plate. These arms likewise may be used for other shutter functions. The spring reacting between the housing and shutter plate may be positioned diametrically opposite from the spring reacting between the shutter plate and the lens tube. In this arrangement the effect of the clearance between the housing and the shutter plate subtracts from the effect of the clearance betweet the lens tube and the shutter plate because the maximum or extreme clearance between each pair of parts is maintained on opposite sides of the optical axis. As a result, the concentric misalignment of the lens holding rings is the difference between both maximum or extreme clearances, in contrast to prior arrangement in which the possible misalignment could be as high as the total of both maximum or extreme clearances when the positioning of the rings is left to chance. This minimizing of concentric misalignment is particularly important when considering that other shutter parts are supported or guided by the lens tube and/or housing, although this added advantage can be sacrificed for a simpler positioning arrangement having a lesser degree of accuracy.

Novel features and advantages of the present invention will become apparent to one skilled in the art from a reading of the following description in conjunction with the accompanying drawings wherein similar reference characters refer to similar parts and in which:

FIG. 4 is a front view in elevation partially broken away in cross section of an embodiment of this invention;

FIG. 5 is a front view in elevation partially broken away of another embodiment of this invention; and FIG. 6 is a cross-sectional view taken through FIG. 5 along the line VI—VI.

Figure 1:
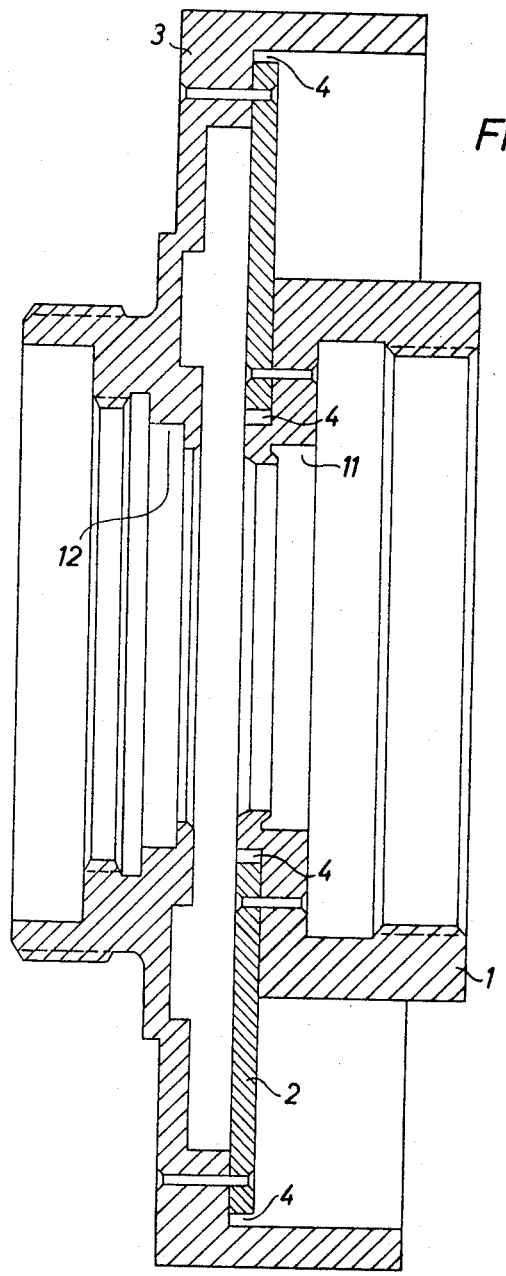
FIG. 1 is a cross-sectional view in elevation of a prior art between-the-lens shutter assembly.

FIG. 1 shows a prior art between-the-lens shutter assembly in which there is a substantial clearance 4 between lens tube 1 and shutter plate 2 and also between shutter plate 2 and lens housing 3. Lens tube 1 includes a bore 11 for receiving an objective lens component (not shown), and lens housing 3 has a bore 12 for receiving another objective lens component (not shown).

Figure 2:
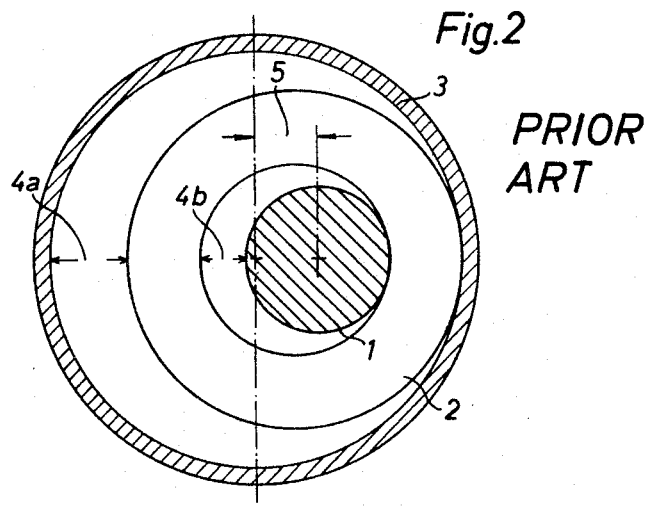
FIG. 2 is a schematic cross-sectional view in elevation showing an extreme condition of concentric misalignment in the prior art between-the-lens shutter assembly of FIG. 1.

FIG. 2 shows an extreme possible condition of misalignment of the prior art between-the-lens shutter assembly shown in FIG. 1. It does not have any means for controlling the pattern of clearance between the parts thus making it possible for the clearance to accumulate to maximum conditions of misalignment. In the extreme condition of misalignment shown in FIG. 2 maximum clearance 4a between housing 3 and shutter plate 2 exists at the same time as maximum clearance 4b between shutter plate 2 and lens tube 1. These clearance 4a and 4b thus add to each other in misaligning the optical axis of lens tube 1 from the optical axis of housing 3. This causes a maximum amount of misalignment 5 between the optical axes of lens tube 1 and lens housing 3.

Figure 3:
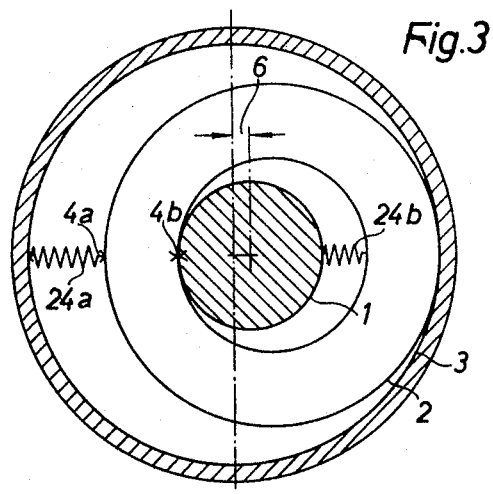
FIG. 3 is a schematic view similar to FIG. 2 illustrating the concentric alignment provided by the embodiment of this invention shown in FIG. 4.

As shown in FIG. 3 the resilient stays 24a and 24b of this invention control the pattern of clearance between the lens holding rings to position clearances 4a and 4b diametrically opposite extreme conditions in which clearance 4a is maximum and clearance 4b is minimum or zero. Lens tube 1 and shutter plate 2 are thus positioned so that their maximum clearance is on the opposite side of the optical axis from the maximum clearance 4a between shutter plate 2 and housing 3. This makes them subtract from each other to cause misalignment 6 to assume a lesser negligible value compared to the maximum possible misalignment 5 in the prior art device as shown in FIG. 2.

FIG. 4 shows a particularly advantageous mounting arrangement for controlling the clearance pattern in the manner schematically shown in FIG. 3. As shown in FIG. 4 two diametrically opposite resilient arms 2a and 2b corresponding to resilient stays 24a and 24b in FIG. 3 are stamped out of shutter plate 2. Arms 2a and 2b act as springs which react against lens housing 3 and lens tube 1 respectively to maintain the concentric misalignment between the lenses at a predetermined negligible value.

FIGS. 5 and 6 show another advantageous mounting arrangement for controlling the pattern of clearance. As most clearly shown in FIG. 6, lens tube 1 and shutter plate 2 are of one-piece construction. Housing 3 is not cylindrical or tubular as shown in FIG. 4, but in this embodiment housing 3 is merely a flanged wall. Shutter plate 2 is secured to flange 3 by fasteners 7 engaged in threaded holes 8 through bosses in flange 3. As also shown in FIG. 6 an adjustment ring 9 for controlling the shutter aperture is assembled over shutter plate 2 and in contact with flange 3. Resilient arm 2c stamped out of shutter plate 2 frictionally holds adjustment ring 9 in place by reacting against it to eliminate play between shutter plate 2 and housing bottom and to thereby control the pattern of clearance 4 between these two lens component holding rings.

As shown in FIGS. 5–6 arm 2c also performs other control functions. For example, as shown in FIG. 5 roller 10 is secured to the free end of spring arm 2c and is engaged in groove 9a of adjustment ring 9 to hold the adjustment ring in a fixed position after it has been rotated. Thus resilient arm 2c not only controls the pattern of clearance 4 between housing 3 and shutter plate 2 but also acts as an arresting spring for holding adjustment ring 9 in place.

Although, as shown in FIGS. 4–5, springs 2a, 2b and 2c are integral with shutter plate 2, in another form of this invention the springs are separate springs which are secured to one of the resiliently braced members by for example rivets, with the free end reacting against the other braced member. In this case, the springs are leaf springs which essentially extend in an axial direction.

In another form of this invention coil springs are secured in radial holes in one of the resiliently braced members, such as housing 3, with the free end reacting against the other member, such as shutter plate 2. This free end of the spring can react directly against the other resiliently braced member, or in another form of the invention the free end carries a ball which contacts the other resiliently braced member. These coil spring arrangements are schematically shown as members 24a and 24b in FIG. 3.

Other modifications can also be made without departing from the spirit of this invention. For example, spring arms similar to arms 2a, 2b, and 2c can be stamped out of housing 3 or lens tube 1. The embodiment shown in FIG. 4, however, permits both springs 2a and 2b to be stamped out of a single member (shutter plate 2) in one operation while also assuring that the springs are disposed diametrically opposite each other.

Additionally, shutter plate 2 can be specially made to resiliently brace or position a pair of adjustment rings, similar to adjustment ring 9. Further, when shutter plate 2 and lens tube 1 are integral as shown in FIG. 6 housing 3 can be assembled over shutter plate 2 as shown for example in FIG. 1. A resilient arm such as 2a, would then control the clearance pattern 4 between plate 2 and housing 3 by reacting directly against housing 3 similar to spring arm 2a of FIG. 4.

What is claimed is:

1. An assembly arrangement for a between-the-lens shutter assembly having an optical axis comprising assembled parts including a shutter plate and lens holding rings on each side of said shutter plate, said assembled parts having a clearance between them, resilient stay means reacting between said shutter plate and a lens holding ring, said resilient stay means having a reaction component directed perpendicularly to and being angularly oriented about said optical axis for maintaining the pattern of contact and clearance between said parts in a predetermined angular orientation about said optical axis whereby their concentric alignment is controlled, said clearance being between each of said lens holding rings and said shutter plate, and said resilient stay means comprising a pair of spring means disposed to react between said shutter plate and both of said lens holding rings on opposing sides of said optical axis whereby the misaligning effects of said clearances subtract from each other.

2. An arrangement as set forth in claim 1 wherein said spring means are disposed diametrically opposite each other whereby said clearances directly subtract from each other.

3. An arrangement as set forth in claim 1 wherein said spring means comprises resilient arms upon said shutter plate.

4. An arrangement as set forth in claim 3 wherein said shutter plate is an annular plate having inner and outer peripheries, said resilient arms being integral with said shutter plate and in their unstressed condition extending slightly beyond said inner and outer peripheries.

5. An arrangement as set forth in claim 2 wherein one of said spring means is integral with one of said parts.

6. An arrangement as set forth in claim 2 wherein one of said lens holding rings is assembled over the outer periphery of said shutter plate, said shutter plate being assembled over a portion of the periphery of said other lens holding ring, said spring means comprising coil springs mounted between said shutter plate and both of said lens holding rings, and said coil springs reacting perpendicularly to said optical axis.

7. An assembly arrangement for a between-the-lens shutter assembly having an optical axis comprising assembled parts including a shutter plate and lens holding rings on each side of said shutter plate, said assembled parts having a clearance between them, resilient stay means reacting between said shutter plate and a lens holding ring, said resilient stay means having a reaction component directed perpendicularly to and being angularly oriented about said optical axis for maintaining the pattern of contact and clearance between said parts in a predetermined angular orientation about said optical axis whereby their concentric alignment is controlled, one of said lens holding rings being secured to said shutter plate, and said resilient stay means being disposed to react between the other of said lens holding rings and said shutter plate.

8. An assembly arrangement for a between-the-lens shutter assembly having an optical axis comprising assembled parts including a shutter plate and lens holding rings on each side of said shutter plate, said assembled parts having a clearance between them, resilient stay means reacting between said shutter plate and a lens holding ring, said resilient stay means having a reaction component directed perpendicularly to and being angularly oriented about said optical axis for maintaining the pattern of contact and clearance between said parts in a predetermined angular orientation about said optical axis whereby their concentric alignment is controlled, one of said lens holding rings being a flanged wall, a ring-shaped member being assembled over and contacting the outer periphery of said flanged wall, and said resilient stay means being disposed to react between said shutter plate and said ring-shaped member for urging said shutter plate and said member into firm contact with each other at a predetermined angular orientation whereby said shutter plate is urged in the opposite direction from said flanged wall and said ring-shaped member.

9. An arrangement as set forth in claim 8 wherein said resilient stay means comprises a spring arm integral with said shutter plate and disposed along its outer periphery.

10. An arrangement as set forth in claim 8 wherein said ring shaped member is an adjustment ring for controlling the shutter aperture of said shutter assembly.

11. An arrangement as set forth in claim 10 wherein said resilient stay means is a spring arm secured to said shutter plate, said adjustment ring having an arresting groove around its inner surface disposed toward said spring arm, and the free end of said spring arm being engaged in said groove to control the alignment of said optical axis and also to hold said adjustment ring in a fixed position after it has been rotated.

12. An arrangement as set forth in claim 11 wherein a roller is mounted on said free end of said spring arm, and said roller being engaged in said groove.

13. An arrangement as set forth in claim 12 wherein said spring arm is integral with said shutter plate.

References Cited by the Examiner

UNITED STATES PATENTS 3,142,239  7/1964  Meixner _____ 95—44

JOHN M. HORAN, *Primary Examiner*.